Feb. 13, 1945.        J. SNEED        2,369,320
BRAKE
Filed Nov. 12, 1941        3 Sheets-Sheet 1

INVENTOR.
John Sneed
BY
Attorneys

INVENTOR.
John Sneed

Feb. 13, 1945.   J. SNEED   2,369,320
BRAKE
Filed Nov. 12, 1941   3 Sheets-Sheet 3
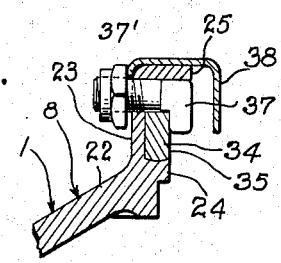
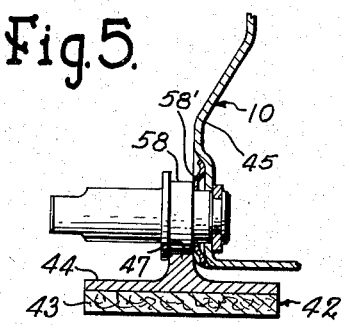
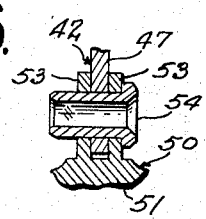
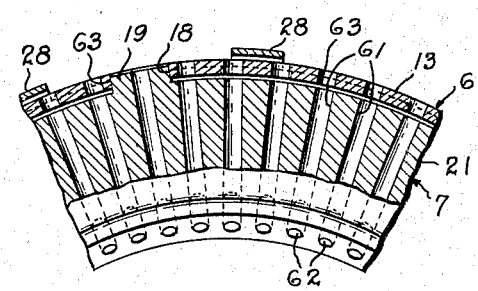
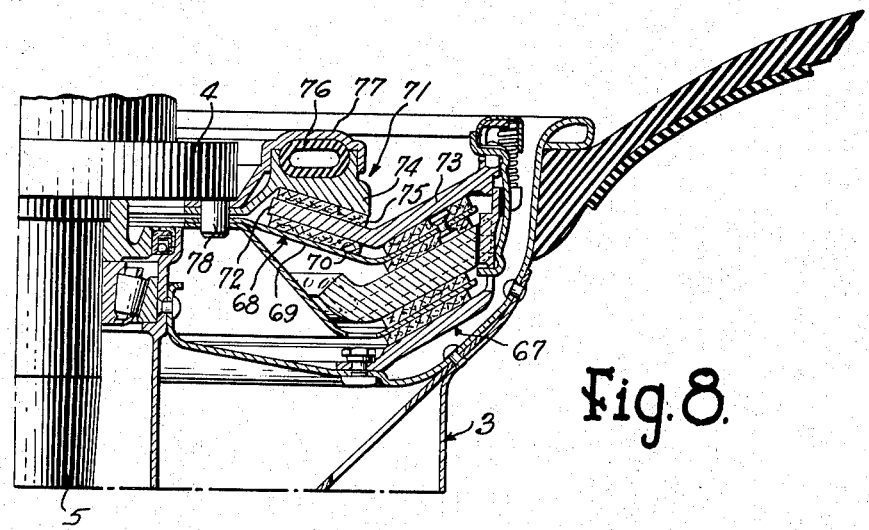
INVENTOR.
John Sneed
BY
Attorneys Patented Feb. 13, 1945

2,369,320

UNITED STATES PATENT OFFICE 2,369,320

BRAKE

John Sneed, Huntington Woods, Mich.

Application November 12, 1941, Serial No. 418,790

12 Claims. (Cl. 188—140)

The invention relates to brakes and refers more particularly to brakes comprising main and pilot brake mechanisms.

The invention has for one of its objects to so construct the brake that its parts are compactly arranged and serve to effect a powerful braking action.

The invention has for another object to so construct the brake that it is highly self-energizing and its output is not changed radically with a drop of the friction coefficient of the friction material as is generally the case with highly self-energizing brakes of other designs.

The invention has for another object to so construct the brake that the main brake mechanism may be easily applied by the pilot brake mechanism.

The invention has for another object to so construct the brake that the main brake mechanism develops the major portion of the total braking torque.

The invention has for another object to so construct the brake that the main brake mechanism is highly efficient in operation with the result that while the efficiency of the pilot brake mechanism may vary, the operation of the brake is reliable.

The invention has for other objects to so construct the brake that the main and pilot brake mechanisms form a unit with the member to be braked and are mountable and demountable as a unit with the member to be braked; and to so construct the brake that one of the brake mechanisms carries the other of the brake mechanisms and, more particularly, the main brake mechanism carries and may be applied by the pilot brake mechanism.

The invention has for a further object to provide improved main and pilot brake mechanisms.

With these as well as other objects in view, the invention resides in the novel features of construction and combinations and arrangements of parts, as more fully hereinafter set forth.

In the drawings:

Figure 1 is an inboard elevation, partly broken away and in section, of a brake embodying the invention;

Figures 2, 3, 4, 5 and 6 are cross sections on the lines 2—2, 3—3, 4—4, 5—5 and 6—6, respectively, of Figure 1;

Figure 7 is a cross section on the line 7—7 of Figure 2;

Figure 8 is a view similar to Figure 2 showing another embodiment of the invention.

Figure 1:
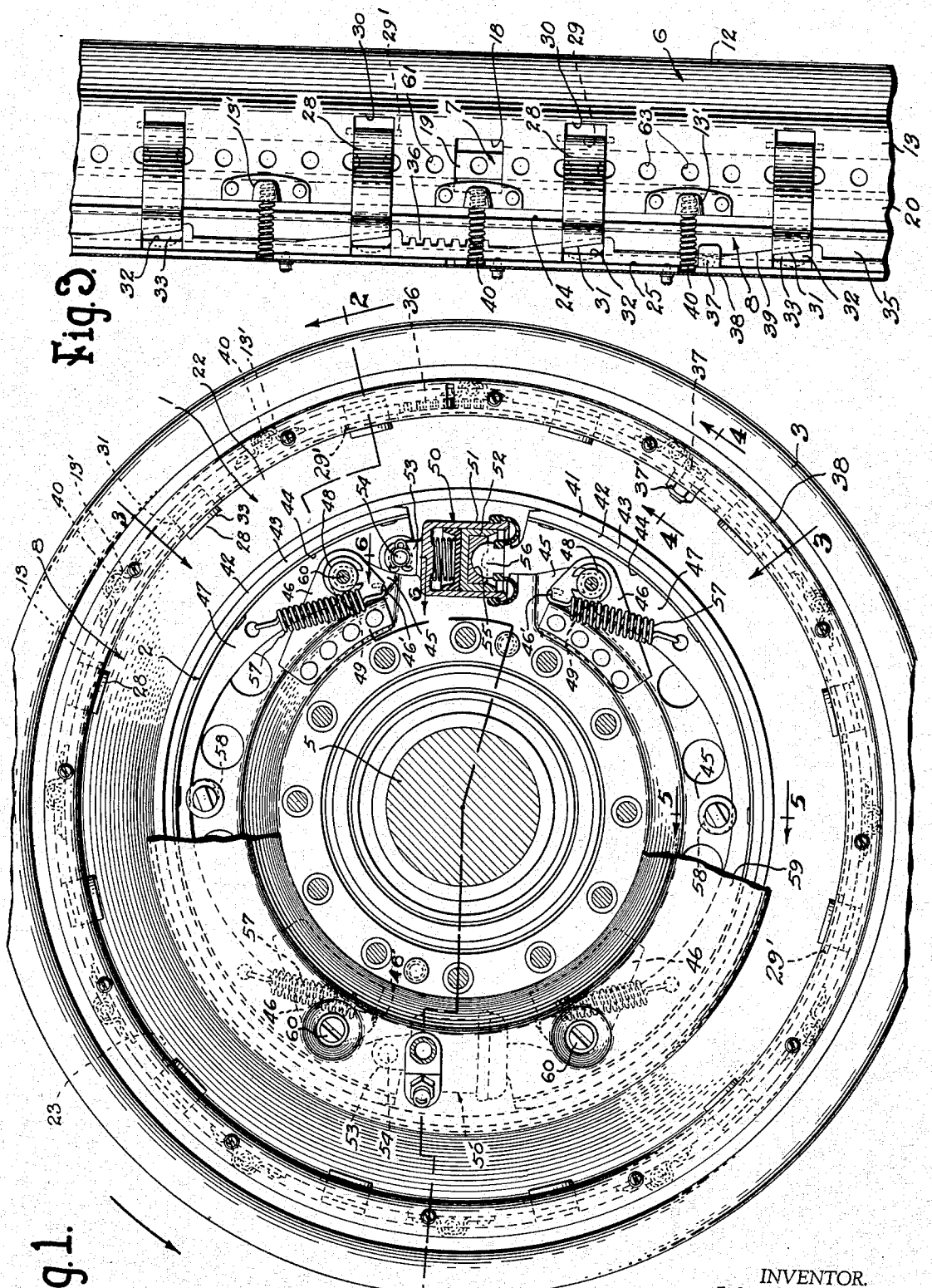

The brake, as illustrated in the drawings, comprises the main brake mechanism 1 and the pilot brake mechanism 2 for applying the main brake mechanism. In the present instance, the brake is shown as applied to an airplane landing wheel 3 which is revolubly on a support comprising the flanged member 4 and the shaft 5 extending in an outboard direction beyond the flanged member.

The main brake mechanism 1 comprises the rotatable outboard, intermediate and inboard friction elements 6, 7 and 8, respectively, and the non-rotatable outboard and inboard friction elements 9 and 10, respectively. The rotatable friction elements have frusto-conical friction faces for engaging the friction linings 11 secured to opposite sides of corresponding frusto-conical portions of the non-rotatable friction elements and the rotatable friction elements are preferably formed of heavier stock than the non-rotatable friction elements for more efficient absorption of the heat generated when the brake is applied. The rotatable outboard friction element 6 is cup-shaped and has the disc 12 and the annular wall 13 extending in an inboard direction from the periphery of the disc. The disc is provided with the frusto-conical portion 14 providing a frusto-conical friction face and with the substantially radial portion 15 which is suitably secured to the landing wheel as by means of the bolts 16 and nuts 17. The annular wall 13 is formed with the axially extending openings 18 into which project radial projections 19 at the outer edge of the rotatable intermediate friction element 7. The annular wall is formed with the enlargement 20 axially inwardly of the openings 18 and encircling and piloting the rotatable inboard friction element 8. The rotatable intermediate friction element 7 is in the nature of a disc having the frusto-conical portion 21 providing frusto-conical friction faces at its opposite sides. The rotatable inboard friction element 8 has the frusto-conical disc portion 22 providing a frusto-conical friction face at its outboard side and also has at its outer periphery the axially extending flange 23 which is provided with the radially outwardly extending outboard and inboard flanges 24 and 25, respectively. The non-rotatable outboard and inboard friction elements 9 and 10 are in the nature of discs having substantially radial central portions each formed with an annular series of holes 26 for slidably engaging the studs 27 extending in an outboard direction from the flanged member 4.

28 are channel-shaped links preferably formed of spring steel operatively connecting the rotatable outboard and inboard friction elements 6 and 8, respectively, and normally rotating the latter with the former. These links extend substantially axially in the normal or off position of the parts and are angularly spaced at equal distances from each other about the annular wall 13 of the outboard friction element and the axially extending flange 23 of the inboard friction element. Each link is provided at its outboard end with the radially inwardly extending portion 29 extending through an opening 30 in the annular wall 13 and abutting the inboard end of the opening. Each link is provided at its inboard end with the radially inwardly extending portion 31 extending through an opening 32 in the axially extending flange 23 and terminating in the axial portion 33 which extends in an inboard direction. The radially inwardly extending portion 31 is engageable with one of the cams 34 of the cam ring 35. The cam ring is located at the inboard side of the outboard flange 24 and is provided with the rack teeth 36 for engagement by a suitable tool to effect rotative adjustment of the cam ring. 37 is a clamp extending through and secured to the axially extending flange 23 by the nut 37' for holding the cam ring in various positions of rotative adjustment. For preventing the links from becoming accidentally disengaged there is the sheet metal annular guard 38 detachably secured to the inboard flange 25 and having the radially inner axially extending portion 39 which extends between the terminal portions 33 of the links and the axially extending flange 23. There are also the lateral projections 29' upon the radially inwardly extending portions 29 of the links 28, the projections extending circumferentially inside the annular wall 13 of the rotatable outboard friction element 6 beyond the openings 30. 40 are compression coil springs located circumferentially between the links 28 and having their opposite ends operatively connected to the rotatable outboard and inboard elements 6 and 8, respectively, to resiliently hold the same in normal or off position. In detail, the end portions of each coil spring are located within the radially outer axially extending flange 38' of the annular guard 38 and the channel-shaped clip 13' which is secured to the radially outer face of the annular wall 13. The ends of each coil spring abut the webs of the annular guard and clip, the arrangement being such that the annular guard and the clips hold the coil springs in place and also serve as abutments.

The construction is such that the rotatable inboard friction element 8 is normally rotated with and at the same rate as the rotatable outboard friction element 6 with the links extending axially. However, when the rotatable friction element 8 is retarded the links are moved angularly so that their radially inwardly extending end portions compel the rotatable inboard friction element 8 to move in an outboard direction into engagement with the non-rotatable inboard friction element 10, thereby forcing the latter against the rotatable intermediate friction element 7, which latter in turn is moved in an outboard direction against the non-rotatable outboard friction element 9 which is finally moved into engagement with the rotatable outboard friction element 6.

It will be noted that the clearance between the friction faces of the rotatable and non-rotatable friction elements may be readily varied by rotative adjustment of the cam ring.

The pilot brake mechanism 2 is operatively connected to the main brake mechanism 1 to apply the latter during the rotation of the landing wheel when the former is applied. In detail, the pilot brake mechanism comprises the rotatable brake drum 41 and the friction elements 42 engageable with the cylindrical inner friction face of the drum. The drum extends in an inboard direction from the inner edge of the rotatable inboard friction element 8 and is preferably integral therewith. The friction elements 42 are brake shoes of T-section having the friction linings 43 secured to the radially outer faces of their axial flanges 44. The shoes are carried by the non-rotatable inboard friction element 10 which is preferably formed with the pair of bosses 45 depressed in an inboard direction and providing recesses between their adjacent ends. 46 are brackets fixedly secured to the inboard faces of the bosses at their ends and cooperating with the bosses to guide the webs 47 of the shoes. The shoes are adapted to be anchored by the anchor pins 48 which extend through the bosses 45 and the brackets 46 and are fixedly secured thereto. The shoe webs are notched to receive the anchor pins and the notches are shaped to form substantially radially extending shoulders 49 engageable with the anchor pins for limiting the circumferential movement of the shoes toward each other. The notches, however, provide clearances for the anchor pins permitting the shoes to move away from each other.

50 are diametrically opposite fluid pressure operated actuators or wheel cylinders in the recesses between the ends of the bosses 45 and in the spaces between the ends of the shoe webs. Each actuator comprises the cylinder 51 and the piston 52 slidable within the cylinder. The cylinder is formed at its closed end with the furcations 53 located on opposite sides of the end of a shoe web and pivotally connected thereto by the pivot pin 54. The piston is formed in its outer face with the concave seat 55 for engaging a correspondingly shaped head 56 formed at the end of the web of the other shoe. The actuators are preferably arranged with their axes substantially vertical and with their cylinders opening downwardly. It will be noted that the construction is such that the actuators are carried and positioned by the shoes.

57 are retracting coil springs extending between the webs of the shoes and the shoulders 46' on the brackets 46 for resiliently holding the shoulders 49 against the anchor pins 48, there being a pair of retracting springs for each shoe.

For controlling the clearance between the linings 43 and the brake drum 41, I have provided the adjustable eccentrics 58. These eccentrics are mounted on the bosses 45 of the non-rotatable inboard friction element 10 to engage the inner edges of the webs of the shoes at their middles. Suitable bowed spring washers 58' serve to frictionally hold the eccentrics in their adjusted positions. The webs preferably decrease in radial dimension from their shoulders 49 to their middles to progressively increase the flexibility of the shoes toward their middles.

To protect the pilot brake mechanism, there is the annular closure plate 59 of generally channel-shaped cross section having its radially inner flange terminating adjacent the radially outer face of the flanged member 4 and its radially outer flange overlapping the drum 41 by encircling the same. This closure plate is secured in place by the screws 60 threaded into the anchor pins 48 and clamping the closure plate thereto. The inner flange of the closure plate is of greater diameter than that of the flanged member to provide clearance when mounting or demounting the brake.

Figure 2:
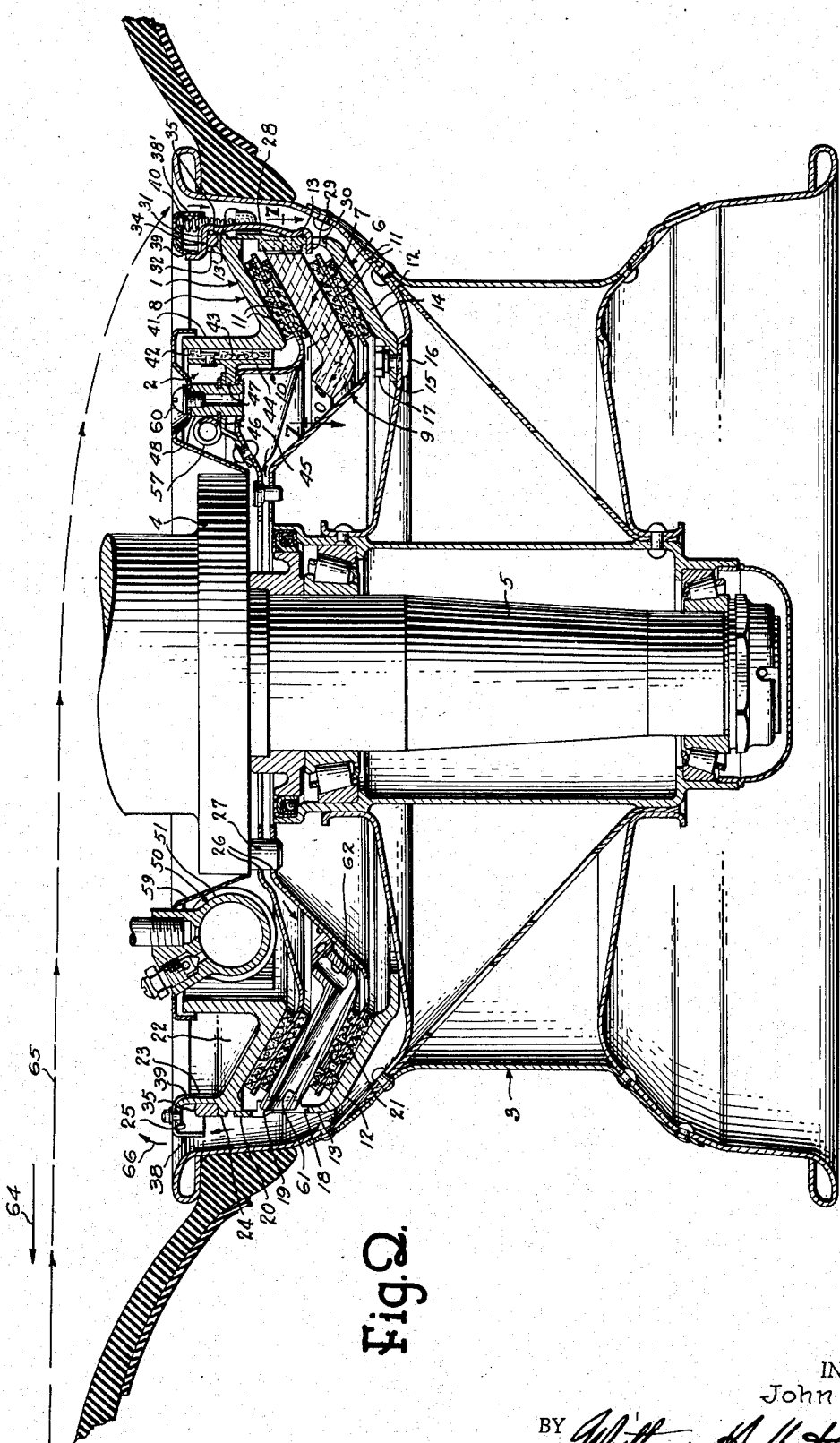

For the purpose of assisting in cooling, the brake is constructed to provide for the flow of air through the brake. Furthermore, the brake is constructed to utilize the air stream resulting from forward movement of the wheel. More particularly, the rotatable intermediate friction element 7 is provided with the generally radially extending passageways or bores 61 open at both their radially inner and outer ends and with the generally radially extending passageways or bores 62 intersecting and opening into the passageways or bores 61. The passageways or bores 62 are open at their radially inner ends. Also, the annular wall 13 of the rotatable outboard friction element is formed between the openings 18 with the generally radially extending passageways or bores 63 in registration with the radially outer ends of the passageways or bores 61. As a result, air may flow through the passageways or bores of both the rotatable intermediate friction element and the annular wall of the rotatable outboard friction element to assist in cooling the brake. It will be noted also from Figure 2 particularly that when the wheel and attached brake are moving in the direction indicated by the arrow 64, the air is deflected by the forward portion of the tire and has an approximate path of travel indicated by the arrow 65, creating a pressure less than atmospheric in the forward portion of the space between the rim and the annular wall of the rotatable outboard friction element and a pressure greater than atmospheric in the rearward portion of the space between the rim and the annular wall. As a result, the air stream is utilized to cause air to flow through the rearward passageways or bores and then through the annular chamber formed by the portions of the non-rotatable outboard and inboard friction elements 9 and 10 radially inwardly of the rotatable intermediate friction element 7 and finally through the forward passageways or bores and axially outwardly, as indicated by the arrow 66.

It will be noted that the brake drum of the pilot brake mechanism is concentrically carried by the rotatable friction elements of the main brake mechanism. Also, that the non-rotatable friction elements of the main brake mechanism are positioned by the rotatable friction elements of the main brake mechanism when the main brake mechanism is disengaged from the support for the wheel. Moreover, the non-rotatable friction elements, the actuators and the retracting springs of the pilot brake mechanism are concentrically carried by the non-rotatable inboard friction element of the main brake mechanism. As a result, the construction is such that the pilot brake mechanism and the main brake mechanism form a unit with the wheel and are mountable and demountable with the wheel as a unit.

As shown in Figure 8, the main brake mechanism 67 differs from the main brake mechanism 2 by forming the non-rotatable inboard friction element 68 with the frusto-conical disc portion 69 extending radially inwardly and axially in an inboard direction from the outer frusto-conical portion and by securing to the inboard face of the frusto-conical disc portion 69 the friction lining 70. By reason of this change, the inner portion of the non-rotatable friction element forms a non-rotatable friction element of the pilot brake mechanism 71. The latter comprises, in addition, the frusto-conical disc friction element 72 engageable with the friction lining 70 and connected to and preferably integral with the rotatable inboard friction element 73 of the main brake mechanism. The pilot brake mechanism also comprises the non-rotatable inboard annular friction element 74 having secured thereto the friction lining 75 for engaging the inboard face of the frusto-conical friction element 72. The inboard friction element 74 may be moved axially in an outboard direction by suitable means, such as the actuator 76 in the nature of a flexible tube carried by the plate 77. The plate forms a shield and extends over the actuator and is sleeved on the studs 78 at the inboard side of the non-rotatable inboard friction element 74. The latter and the non-rotatable inboard and outboard friction elements of the main brake mechanism are also sleeved on the studs 78.

What I claim as my invention is:

1. In a brake, a pilot brake mechanism comprising a brake drum, a friction element engageable with said drum, and anchor means for limiting circumferential movement of said friction element, and a main brake mechanism comprising axially spaced rotatable friction elements, one of said last mentioned elements being directly connected to said drum, a non-rotatable friction element between said axially spaced friction elements and engageable therewith and carrying said anchor means, and means operatively connecting said axially spaced friction elements for relatively moving the same axially into engagement with said last mentioned non-rotatable friction element when said first mentioned friction element is engaged with said drum.

2. In a brake, a main brake mechanism and a pilot brake mechanism for applying said main brake mechanism, said brake mechanisms comprising relatively rotatable friction elements including a non-rotatable disc member having radially spaced portions forming friction elements for both of said brake mechanisms.

3. In a brake for a demountable rotatable member, a pilot brake mechanism comprising relatively rotatable friction elements engageable with each other and means for relatively moving said friction elements into engagement with each other, and a main brake mechanism comprising relatively rotatable friction elements engageable with each other, one of said last mentioned friction elements being mounted on the demountable rotatable member and carrying one of said first mentioned friction elements and another of said last mentioned friction elements carried by said one of said last mentioned friction elements and carrying another of said first mentioned friction elements, said friction elements of said main brake mechanism being relatively movable into engagement upon engagement of said friction elements of said pilot brake mechanism, all of said friction elements and said moving means being mountable and demountable as a unit with the rotatable member.

4. In a brake for a demountable rotatable member, a pilot brake mechanism comprising a rotatable friction element, a non-rotatable friction element engageable with said rotatable friction element and means for relatively moving said friction elements into engagement with each other, and a main brake mechanism comprising a rotatable friction element mounted on the demountable rotatable member and carrying said first mentioned rotatable friction element, a non-rotatable friction element engageable with said last mentioned rotatable friction element and carrying said first mentioned non-rotatable friction element, and means operatively connecting said first and second mentioned rotatable friction elements to relatively move said second mentioned rotatable and non-rotatable friction elements into engagement upon engagement of said first mentioned rotatable and non-rotatable friction elements, said pilot and main brake mechanisms being mountable and demountable with the demountable rotatable member as a unit.

5. In a brake, a main brake mechanism and a pilot brake mechanism for applying said main brake mechanism, said brake mechanisms comprising rotatable and non-rotatable discs having radially outer and inner portions forming parts of said main and pilot brake mechanisms respectively, said pilot brake mechanism also comprising means for relatively axially moving said radially inner portions toward each other and said main brake mechanism also comprising means operable upon operation of said first mentioned means to relatively move said radially outer portions toward each other.

6. In a brake, a main brake mechanism comprising brake members normally rotatable one with the other, intermediate brake means normally held from rotation, said brake members and brake means having generally conical disc portions provided with interengaging generally conical friction faces, and links extending between and operatively connected to said brake members and having portions extending over said brake means radially outwardly thereof, said links being operable upon retardation of one of said brake members to relatively move said friction faces into engagement, and a pilot brake mechanism comprising a pilot brake member located substantially within the confines of and secured to one of said first mentioned brake members at its radially inner edge and rotatable therewith, friction means normally held from rotation and engageable with said pilot brake member, and means for moving said friction means into engagement with said pilot brake member.

7. In a brake, a main brake mechanism comprising brake members normally rotatable one with the other, intermediate brake means normally held from rotation, said brake members and brake means having frusto-conical disc portions provided with interengaging frusto-conical friction faces, and spring links extending between and operatively connected to said brake members and having portions extending over said brake means radially outwardly thereof, said links being operable upon retardation of one of said brake members to relatively move said friction faces into engagement, and a pilot brake mechanism comprising a pilot brake drum located substantially within the confines of and secured to one of said first mentioned brake members at its radially inner edge and rotatable therewith, friction means normally held from rotation and engageable with said pilot brake drum, and means for moving said friction means into engagement with said pilot brake drum.

8. In a brake, a main brake mechanism comprising brake members normally rotatable one with the other, intermediate brake means normally held from rotation, said brake members and brake means having frusto-conical disc portions provided with interengaging frusto-conical friction faces, and spring links extending between and operatively connected to said brake members and having portions extending over said brake means radially outwardly thereof, said links being operable upon retardation of one of said brake members to relatively move said friction faces into engagement, and means for retarding said one of said brake members.

9. In a brake, relatively rotatable brake members movable axially relative to each other, means for moving said brake members axially relative to each other comprising links extending between and operatively connected to the two outer of said brake members, and means for retaining said links at one end thereof comprising an annular member secured to one of said brake members and extending over said links.

10. In a brake for a rotatable member revolubly mounted on a flanged support at one side of the flange, a main brake mechanism comprising axially spaced rotatable friction elements and non-rotatable friction means therebetween, one of said rotatable friction elements being mounted on the rotatable member and substantially concentrically positioning the other of said rotatable friction elements and said non-rotatable friction means, said non-rotatable friction means comprising a non-rotatable friction element slidably engageable with the support at the same side of the flange as the rotatable member, and a pilot brake mechanism comprising a rotatable friction element substantially concentrically positioned by one of said rotatable friction elements and a non-rotatable friction element mounted on and substantially concentrically positioned by said first mentioned non-rotatable friction element, said main and pilot brake mechanisms being mountable on and demountable from the support as a unit with the rotatable member.

11. In a brake for a wheel revolubly mounted on a support, a main brake mechanism comprising a rotatable friction element connected to the wheel and a non-rotatable friction element mounted on the support, and a pilot brake mechanism comprising a rotatable element connected to the wheel, a non-rotatable friction element mounted on the support and means for relatively moving said last mentioned rotatable and non-rotatable friction elements into engagement, said rotatable and non-rotatable friction elements of said main and pilot brake mechanisms also being connected to each other to form a unit and being mountable on and demountable from the support as a unit with the wheel.

12. In a brake for a wheel, a main brake mechanism mounted on the wheel comprising relatively rotatable friction elements and a pilot brake mechanism comprising relatively rotatable friction elements and means for moving said last mentioned friction elements into engagement, said pilot brake mechanism being operatively connected to said main brake mechanism to apply the latter when the former is applied, said relatively rotatable friction elements of said main and pilot brake mechanisms being connected to each other to form a unit and being mountable and demountable as a unit with the wheel.

JOHN SNEED.